Dec. 11, 1951      E. W. BAUER      2,578,499

SURGE INSULATION TESTER

Filed Aug. 1, 1947      4 Sheets-Sheet 1

INVENTOR:
EARL W. BAUER,
BY Carr Harr Gravely,
His ATTORNEYs.

Dec. 11, 1951  E. W. BAUER  2,578,499
SURGE INSULATION TESTER
Filed Aug. 1, 1947  4 Sheets-Sheet 2

FIG. 4.

INVENTOR:
EARL W. BAUER,
BY Carr Harr Gravely,
his ATTORNEYS.

INVENTOR:
EARL W. BAUER,

Patented Dec. 11, 1951

2,578,499

UNITED STATES PATENT OFFICE 2,578,499

SURGE INSULATION TESTER

Earl W. Bauer, St. Louis, Mo., assignor to Wagner Electric Corporation, St. Louis, Mo., a corporation of Delaware Application August 1, 1947, Serial No. 765,445

2 Claims. (Cl. 175—183)

This invention relates to an apparatus for the detection of irregularities, such as insulation failure, wrong numbers of turns and grounds, which may exist in the coils used in electrical apparatus either as a result of errors in manufacturing operations or of incidents of use. The main object of the invention is to provide a rapid and sensitive means of testing whereby the indication of the quality of the tested apparatus is visually indicated to the operator.

In order to detect inter-turn shorts which may include as few as one turn, it is necessary to subject the winding to a high frequency current and provide a means of indicating the abnormal condition, if such should exist. When subjected to an alternating current potential the inductance of an iron cored coil changes in proportion to the square of the number of turns while the resistance of such a coil changes at a much lower rate. As the total impedance is composed of a combination of the inductance and resistance components, it is easily seen that a relatively larger change will be observed if means for indicating the change in inductance is utilized rather than if a means for indicating the change in resistance is utilized. In accordance with this invention a change of inductance is ascertained by including the inductance in a circuit containing resistance and capacity and measuring the natural period of oscillation of the circuit. The frequency of the oscillation increases with a decrease in inductance if the total capacity of the circuit is held constant. This principle is utilized in this invention by comparing the natural frequency of a circuit containing the winding under test with a similar circuit containing a standard winding. The resultant high frequency currents through each winding are compared with each other by means of a cathode ray oscilloscope.

Figures 1, 2:
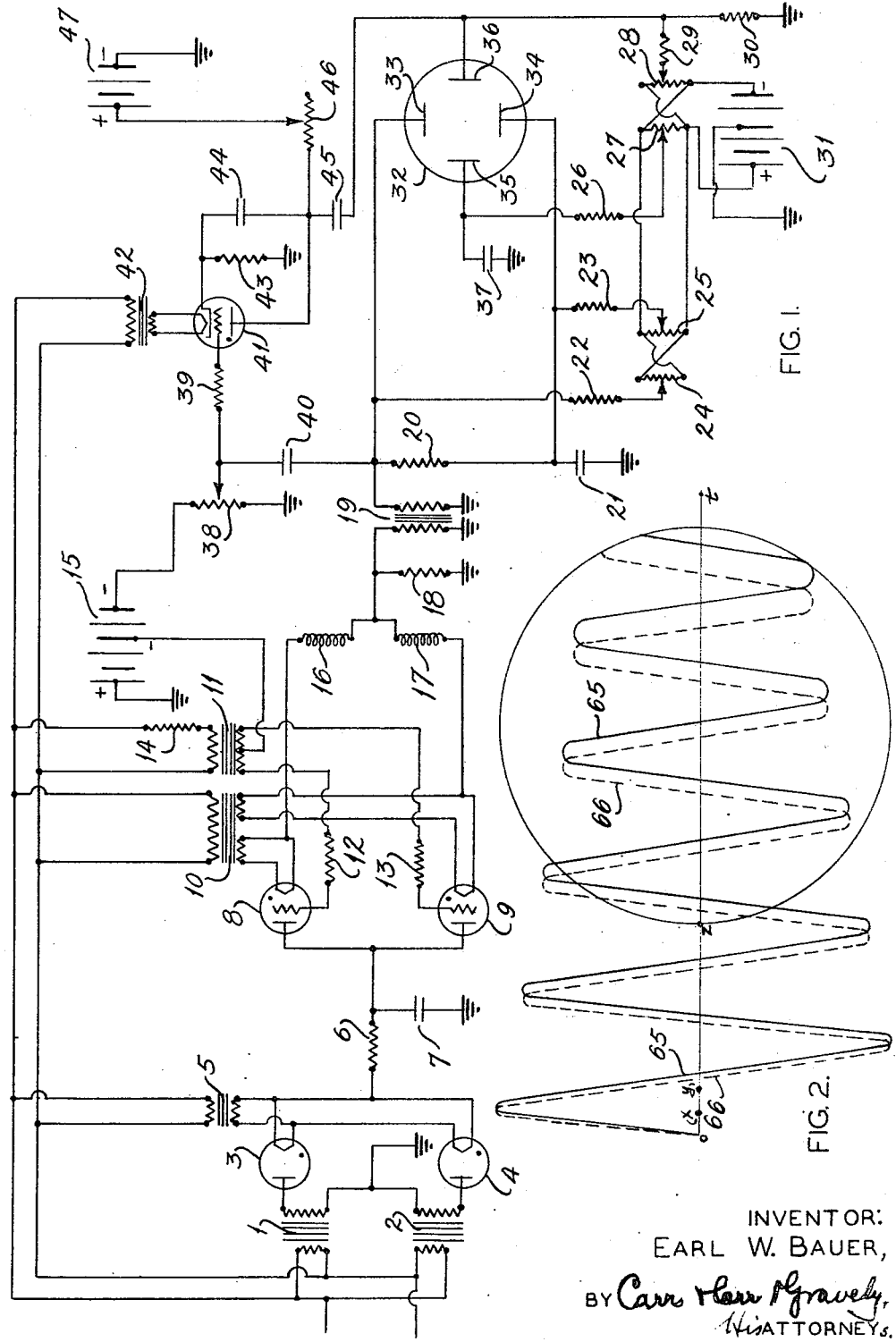
Figure 3:
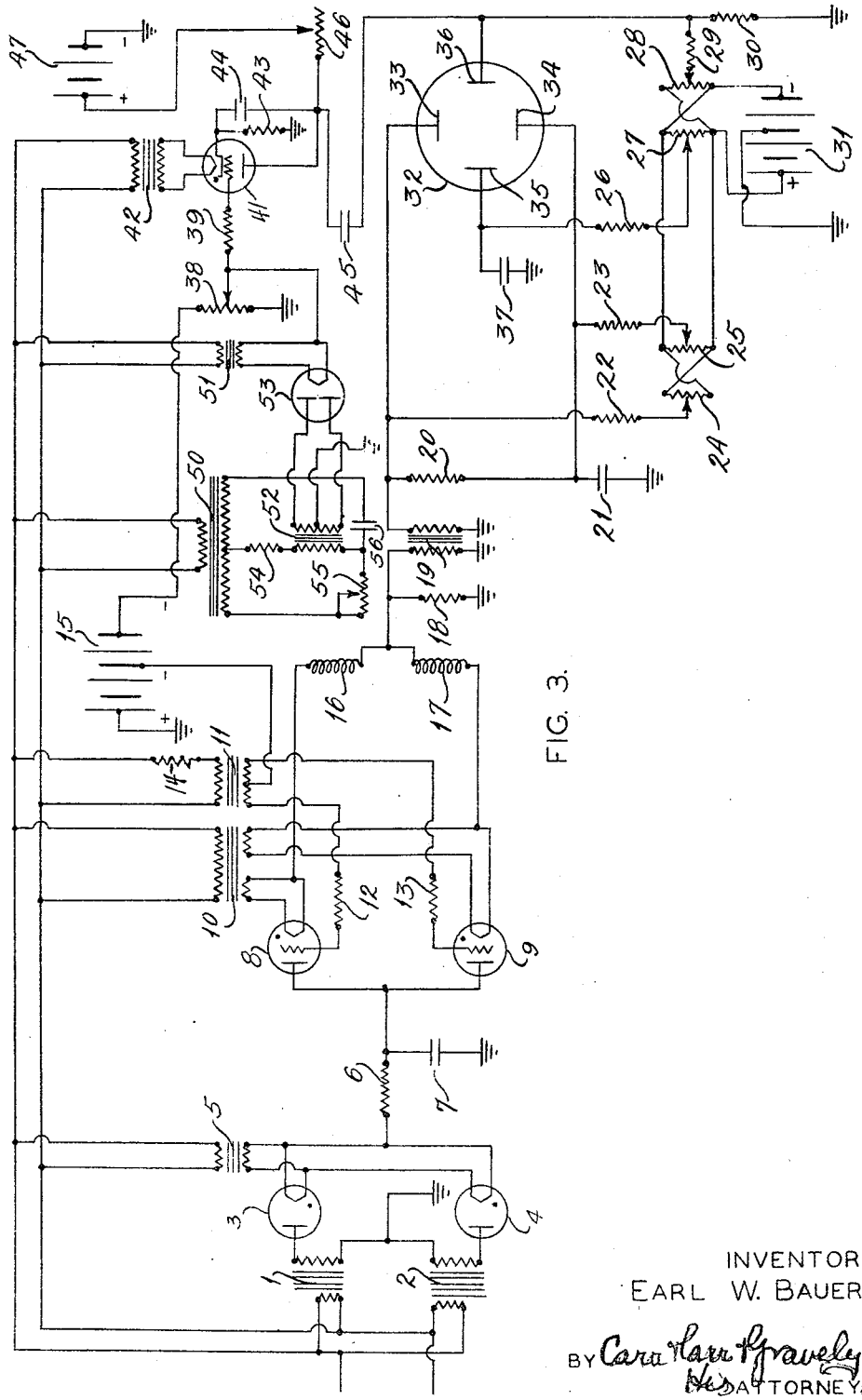
Figure 5:
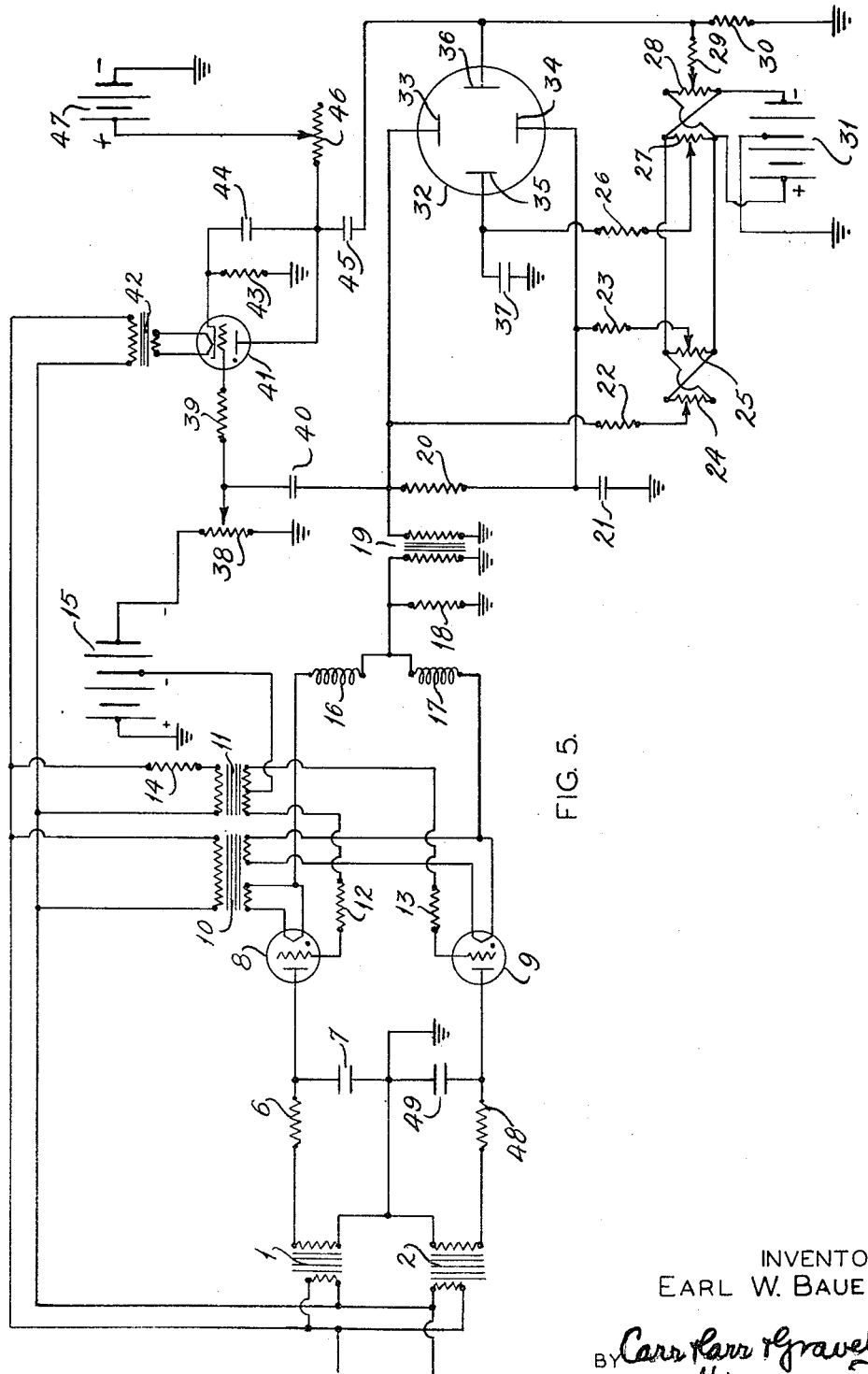

In the accompanying drawings Figure 1 is a schematic diagram of apparatus embodying my invention;

Figure 2 shows two decremented oscillatory waves such as are created by the discharge of a capacitor through an inductance having a certain amount of resistance;

Figures 3 and 4 also disclose apparatus embodying my invention and differ from Figure 1 in that they disclose different methods of controlling the sweep circuit of the oscillograph; and Figure 5 corresponds to Figure 1 except as to the means for producing the current for energizing the windings being compared.

In Figure 1 the transformers 1 and 2, supplied from a commercial A. C. power source, are identical and are used to supply alternating voltage of the proper potential to the plates of the half wave gas filled rectifier tubes 3 and 4 whose filaments are heated by the current supplied from the transformer 5. The rectified current flowing through tubes 3 and 4 flows through the resistor 6 to charge the capacitor 7. The resistor 6 is so proportioned with relation to capacitor 7 that the latter is capable of being fully charged to the peak A. C. potential of the supply in less than one quarter cycle of the A. C. supply frequency. The tubes 8 and 9 are of the type of gas filled grid controlled rectifiers. These tubes act as switches to discharge capacitor 7 alternately through the stator winding 16 under test and the comparison winding 17. The filaments of tubes 8 and 9 are heated by current supplied by the transformer 10 whose primary is in turn energized from the A. C. power source. The saturated core transformer 11, having the impedance 14 connected in series with its primary, supplies a peaked voltage wave to the grids of tubes 8 and 9 through the current limiting resistors 12 and 13, respectively. Due to the grounding of the center of the secondary winding of transformer 11 through a D. C. supply, for example, battery 15, the grids of tubes 8 and 9 are negative in respect to their corresponding filament as long as no appreciable voltage is added to the grid circuits by transformer 11. Once every half cycle the peaking transformer 11 adds a peaked voltage to the D. C. voltage of the D. C. supply 15. When this occurs, the grid of one of tubes 8 and 9 is made positive in respect to its filament while the other grid is made more negative in respect to its filament. When the peaking transformer 11 supplies peaked voltage during the next half cycle, the polarities of the grids reverse and the grid which was made positive before now is made excessively negative while the grid which was made excessively negative before is now made positive.

The D. C. supply 15 supplies a negative voltage D. C. bias to the grids of tubes 8 and 9 to maintain these tubes in a condition to prevent the flow of current between the plate and filament thereof except during the period between the application of the positive peaked wave and the next occurrence of zero potential in the A. C. power supply from transformers 1 and 2.

When the grid of tube 8 is made positive by the potential supplied from the peaking transformer 11, the capacitor 7 discharges through circuit comprising tube 8, stator winding 16, and resistor 18, to ground. When the grid of tube 9 is made positive by the potential supplied from the peaking transformer 11 on the next half cycle, the capacitor 7 discharges through circuit comprising tube 9, stator winding 17, and resistor 18, to ground. Across resistor 18 is connected the high impedance step-up transformer 19 which transforms the relatively low voltage drop across 18 into a higher voltage which sends current from transformer 19 through resistor 20 and the capacitor 21 to ground and back to the other terminal of the secondary of transformer 19. The voltage drop across resistor 20 excites the oscilloscope plates 33 and 34 and produces the vertical deflection of the oscilloscope beam.

The vertical position of the horizontal zero line of the cathode ray tube 32 is adjusted by selecting a D. C. potential from the potential divider comprising resistors 24 and 25 which are in turn supplied by the D. C. supply, such as battery 31, and applying this potential to plates 33 and 34 of tube 32 through the resistors 22 and 23 which limit the energy which transformer 19 may cause to flow to ground through 31. The D. C. supply 31 has its center point grounded and the positive and negative potentials delivered to resistors 24 and 25 of the potential divider are equal in magnitude. When both contacts are moved to the top terminals of resistors 24 and 25, the oscilloscope plate 33 reaches its extreme positive D. C. potential and the oscilloscope plate 34 reaches the extreme negative D. C. potential in respect to ground. Similarly, when the contacts on 24 and 25 are at the bottom position, the same potentials, but of reversed polarity, appear on plates 33 and 34 of oscilloscope tube 32. When the contacts are in the center position shown in Figure 1, the oscilloscope plates 33 and 34 have ground potential.

The beam of the cathode ray tube, produced by a well-known circuit which is not a part of this invention and therefore not shown, is swept vertically up or down across the face of the tube in synchronism with the pulses of current which pass through resistor 18.

Initially, the beam is held off the face of the cathode ray tube 32 in the direction of deflecting plate 36 by a positive potential supplied from the resistor 28 of the potential divider 27, 28, through resistor 29 to the horizontal deflecting plate 36 while a negative potential supplied from resistor 27 through resistor 26 is applied to the horizontal deflecting plate 35. The D. C. potential applied to the potential divider comprising resistors 27 and 28 is supplied from the D. C. supply 31 previously described. A by-pass capacitor 37 provides an alternating current path from deflecting plate 35 to ground.

The means for moving the beam toward plate 35 from the position described in the preceding paragraph comprises a grid controlled rectifier tube 41, capacitors 44 and 45, resistors 43 and 46, D. C. supply 47, and suitable resistors hereinafter mentioned.

The junction point between capacitors 44 and 45 has the same potential to ground as the positive terminal of the D. C. source 47. Thus capacitor 44 is charged to a voltage equal to that of the D. C. supply 47, the voltage of the latter preferably being selected to have a higher positive potential to ground than that imposed on deflecting plate 36 by D. C. source 31. The difference between said potentials equals the potential difference between the plates of the capacitor 45 which is in circuit between plate 36 and capacitor 44. Thus the bottom plate of 45 has a potential to ground which is identical to the potential of plate 36 to ground.

The tube 41 is a grid controlled tube rectifier having similar characteristics to those described in connection with tubes 8 and 9 above. Its filament is supplied with current from transformer 42 and its grid is biased to a negative potential by the D. C. supply 15 through the potentiometer 38 and the current limiting resistor 39. The tube 41 passes current between its plate and filament when a positive impulse potential is impressed on its grid from transformer 19 through the D. C. blocking capacitor 40 and the current limiting resistor 39.

When tube 41 is made conductive, as above described, it short-circuits the capacitor 44 which therefore discharges instantly. Since the resistance 43, connected between 44 and ground, has a low value in comparison with 46 in series with the D. C. supply, the junction point between 44 and 45 has approximately ground potential. At the moment tube 41 short-circuits 44, the potential (in respect to ground) of plate 36 drops because, as the potential of the lower plate of the charged capacitor 45 is below the potential of its upper plate, it follows that when the upper plate is grounded as a result of short-circuiting the capacitor 44, the potential of the lower plate of capacitor 45 must become negative with respect to ground since the resistances 30 and 29, which are of very high value, prevent the capacitor 45 from rapidly losing its charge. Consequently, plate 36, which is connected to the lower plate of 45, is now negative with respect to ground. The value of the negative potential imposed on plate 35 is so selected that when capacitor 44 is short-circuited under the conditions just described plate 36 becomes more negative with respect to ground than plate 35.

When plate 36 becomes more negative than plate 35, the oscilloscope beam moves from its position near plate 36 to a position adjacent plate 35. This re-positioning of the beam takes place very rapidly after the instant tube 41 is made conductive.

As soon as tube 41 ceases to be conductive, because the current flowing therethrough has reached such a low value that the grid again gains control, the capacitor 44 begins to recharge relatively slowly from the D. C. source 47 through the resistances 46 and 43. Thus the potential to ground of the junction point between 44 and 45 rises and will raise the potential of plate 36 in respect to ground since the potential difference across 45 is fixed as explained above. Consequently, the beam moves toward plate 36 while the capacitor 44 is charging. The speed with which the beam returns to its initial position near plate 36 depends on the charging rate of the capacitor 44. This in turn is a function of its microfarad capacity, the value of the resistance 46, and the potential of the D. C. source 47.

Referring now to the operation of the equipment for testing a winding, by means of the peaking transformer 11 the grid of either tube 8 or 9 is made positive with respect to its filament at approximately the peak of the A. C. supply voltage cycle. The point on the A. C. supply wave at which the tube grid becomes positive is determined by the value of the impedance of 14 in the primary circuit of the peaking transformer 11. Impedance 14 is shown as a resistance, but may be either reactive or capacitive. The impedance of capacitor 7 is selected so as to be small in comparison with the impedance of resistor 6. Consequently, the capacitor is fully charged approximately at the instant the A. C. supply voltage is at its positive or negative maximum. Thus one of the grid controlled rectifiers 8 or 9 is rendered conducting each time capacitor 7 is charged. The current flowing through tube 8 flows through the stator winding 16 being tested and resistor 18 thus impressing a voltage across the primary of 19. Equivalently, when tube 9 is conducting, the current flows through a comparison winding 17 of known characteristics. While the current in 18 is the resultant of the rectified current flowing through 6 and oscillatory current produced by the resonant circuit comprising the inductance of winding 16 or 17 and capacitor 7 previously mentioned, the screen images hereinafter referred to do not materially differ from those which would result from the oscillatory current alone.

The voltage across the secondary of 19 is impressed on the grid of tube 41 which then passes current and discharges capacitor 44, thus causing the junction point between capacitors 44 and 45 to be reduced very quickly to approximately ground potential and thereby moves the cathode beam instantly toward plate 35, as explained above.

As soon as capacitor 44 is discharged, tube 41 returns to a non-conducting condition and the capacitor 44 slowly returns to a charged condition and, as shown above, the cathode ray beam returns to its initial position near deflecting plate 36 at a much slower rate than that at which it proceeded away from its initial position.

The voltage appearing across the secondary winding of transformer 19 is an image of the A. C. current flowing in the circuit consisting of the capacitor 7, resistance 18, and inductive winding 16 or 17. This voltage is impressed on plates 33 and 34 of the oscilloscope tube 32 while the beam is sweeping from its position near plate 35 to initial position near plate 36. Thus the actual motion of the beam is that resulting from the combined effects of plates 33 and 34 and plates 35 and 36 and this motion is visible on the oscilloscope screen.

It is to be noted that by changing certain values of circuit constants in the sweep circuit, various conditions of operation may be attained. For example, changing the value of potential of the D. C. supply 47 will change the extent of motion of the beam which will be caused by plates 35 and 36. Changing the value of either or both capacitor 44 and resistor 46 will change the charging rate of capacitor 44 and thereby the speed of return of the beam to its initial point. Changing the point at which the D. C. potential is taken off the voltage divider consisting of 27 and 28 (which should be accomplished by moving both contacts in the same direction simultaneously) changes the potential difference across plates 35 and 36, thus moving the initial image point of the beam more to the right when the initial positive potential of plate 36 is increased and also moving the point of extreme excursion to the right by an equal amount.

By changing the bias voltage on the grid of tube 41 by means of potentiometer 38, the time during the first positive excursion of the potential wave produced by transformer 19 at which the cycling of the sweep circuit will be initiated can be selected. Due to the D. C. bias voltage applied to the grid of tube 41, the tube discharges only when the applied A. C. exceeds said bias voltage and only a single sweep of the beam occurs following such discharge.

It will be understood from the foregoing description that if we assume the apparatus is operating without any test winding 16, the path of motion of the beam in a plane perpendicular to the axis of the oscilloscope tube will be similar to that indicated by the full lines of Figure 2. Also, if the apparatus were operated with the winding 16 in circuit but without any comparison winding 17 in circuit, the path of the beam would be the same as just mentioned. In accordance with my invention the parts are so proportioned and related that only the portions of the lines appear on the oscilloscope screen which are embraced by the circle in Figure 2. In this figure the full lines represent the image produced when only one of the windings 16 or 17 is in circuit and when both windings are in circuit the image will, for the reasons hereinafter explained, be that indicated in Figure 2 when winding 16 is defective in some particular, for instance, embodies a short-circuited turn.

The material of the screen has the characteristic that, once excited, the path of the beam across the screen remains luminous for a small but finite time. This phenomenon coupled with the persistence of vision of the human eye causes it to appear that two waves are on the screen of the tube at the same time, if the electrical constants of the two stators differ, through one of them is an indictaion of the oscillatory current flowing through the stator winding 16 and the other is an indication of the oscillatory current flowing through the stator winding 17. If the two stators are identical, there will appear to be only one wave on the screen.

Figure 2 shows the form of two decremented oscillatory waves whose only difference is in the amount of inductance in the circuit producing the wave. Decremented oscillatory waves are created by the discharge of a capacitor through an inductance having a certain amount of resistance. It will be seen that if both waves are assumed to start at the same time, as shown at zero in Figure 2, there will be a progressively greater deviation in the time at which the two waves cross the zero axis when progressing in the same direction with each subsequent cycle while very little change in the amplitude of one wave relative to the other occurs. It is seen, therefore, that the further away from time zero an examination of the relationship of the two waves 65 and 66 is made, the easier it will be to detect a deviation between the frequencies (up to the point where one wave is a half cycle displaced from the other). Displacement of wave images is an indication of a winding fault the result of which is a change of inductance.

To utilize the foregoing characteristics to best advantage in testing a winding, I so adjust the beam of the cathode ray oscillograph (by the means heretofore described) that its initial point is off the screen of tube 32 to the right, its position being represented on Figure 2 as point "t." Upon the initiation of the oscillating current in the circuit consisting of capacitor 7, stator 17, and resistor 18, a voltage induced in the secondary winding of transformer 19 is impressed upon the vertical deflecting plates 33 and 34 of tube 32 (Figure 1) and at the same time this voltage is impressed upon the grid of tube 41. The potentiometer 38 is so adjusted that at the time "x," indicated in Figure 2, the A. C. potential exceeds the D. C. bias of the grid of tube 41 and capacitor 44 discharges very rapidly. As explained above, the beam of the cathode ray tube 32 then moves instantly from the point "t" horizontally to the left beyond the screen, for example, to the point "y" at which time, the capacitor 44 having completely discharged, the voltage across the plate and cathode of tube 41 becomes zero and the grid again gains control, thus causing all current to cease flowing between the cathode and plate of tube 41. The capacitor 44 then begins to recharge relatively slowly from the D. C. supply 47 through the resistor 46. The rate of voltage rise above ground of the junction point between capacitors 44 and 45 and the consequent rate of sweep of the beam from point "y" toward "t" is determined by the value of resistor 46 if the value of capacitor 44 is held constant. After a time equivalent to that required for the beam to move from point "y" to point "z" (at the rim of the viewing screen), the beam appears upon the screen and the image of the wave becomes visible to the operator. Having swept across the screen, the beam continues to the point "t" where it remains until the next A. C. impulse is received which overcomes the grid bias.

If the next impulse received by tube 41 is produced by a wave having a slightly higher frequency than the preceding wave, its screen image will be laterally displaced from the position occupied by the image of the preceding wave, the amount of this displacement progressively increasing, as indicated in Figure 2 where the dotted line indicates the image produced by the higher frequency wave. When winding 16 embodies a short-circuited turn, the frequency of A. C. voltage impressed on plates 33 and 34 of tube 32 will be higher when transformer 19 is excited through 16 than when excited through 17 and this results in two waves relatively displaced appearing on the screen image when such defect in 16 exists. As previously stated, two wave images are not simultaneously produced on the screen but such is the indication to the eye for reasons previously explained.

Such stator winding faults as erroneous number of turns, shorted turns, grounds, and open circuits, all affect the natural period of oscillation of the oscillatory circuit of which the winding is a part and, therefore, are indicated by the image appearing on the screen when testing the winding in comparison with the selected standard winding 17.

By providing means which determines that the initial position of the beam will be substantially to the right of the screen, I am able to produce on a relatively small cathode ray screen, an image of the parts of the A. C. waves which are most widely displaced under the condition of defect in the winding to be tested and thus secure an image in which the displacement between the waves is easily observable.

Though the preferred method of controlling the time of discharge of capacitor 44 is shown in Figure 1, other methods may be employed. Figures 3 and 4 show two other methods of controlling the delay time of the beginning of the discharge of capacitor 44 through tube 41 in respect to the instant at which the oscillatory wave is initiated.

Figure 3 embodies the parts and circuits of Figure 1 except capacitor 40 and also embodies the additional circuits which include transformers 50, 51 and 52, tube 53, resistors 55 and 54, and capacitor 56. Instead of the voltage appearing on the secondary of transformer 19 being utilized to control the conduction of current by tube 41, as in the Figure 1 apparatus, in the apparatus of Figure 3 tube 41 is controlled by a voltage produced by passing current from the A. C. supply through transformer 50 and the phase-shifting network consisting of resistor 55 and capacitor 56 to the primary of the saturated core transformer 52 which has resistor 54 in series therewith. The voltage appearing across the secondary of the saturated core transformer 52 is peaked in form as a result of the current limiting resistor 54 in the circuit of the transformer primary. The center of the secondary winding of 52 being grounded, causes a voltage wave of positive polarity to be produced at one end of the secondary winding on every other half cycle and a positive polarity wave at the other end of the secondary winding on the alternate half cycles. The tube 53 is a vacuum type rectifier whose filament is heated by the transformer 51 from the A. C. supply and has two separate plates, each of which is connected to an extremity of the secondary winding of transformer 52. Since rectifier tubes of this type will pass current only when the plate is positive with respect to the filament, it follows that pulses of current flow through tube 53 every time the voltage wave on one of its plates is positive with respect to ground. Therefore, a pulsating current having twice the frequency of the A. C. supply flows from transformer 52 through tube 53 and resistor 38 to ground. The value of the current flowing through resistor 38 must be great enough to cause a positive potential to appear on the grid of tube 41. The time at which this positive potential appears upon the grid of tube 41 is determined by the adjustment of resistor 55 and is so adjusted that the sweep from left to right of the cathode ray beam in tube 32 is initiated at the proper time after the discharge of capacitor 7 so that the first few cycles of the oscillatory voltage wave from transformer 19 do not appear on the screen of tube 32. The reasons for omitting these from the screen image were explained above in connection with Figures 1 and 2.

While, in comparison with Figure 1, Figure 3 requires additional transformers, resistors and other apparatus, it has the advantage of permitting a much wider adjustment in the time relation between the beginning of discharge of the capacitor 7 and the rendering of tube 41 conductive and, therefore, renders the test apparatus applicable to a wider range of stator windings in that the portion of the entire series of decremented waves which appears on the oscilloscope screen may be selected which results in the best test conditions for a winding of the particular characteristics of that being tested. For example, in testing a winding of particular characteristics it may be desirable that the screen image include the decremented waves indicated by Figure 2, whereas in testing a winding of different characteristics it may be desirable that the screen image embrace the portion of these waves having a wider separation than those indicated on the screen of Figure 2.

Figure 4 illustrates an apparatus alternative to Figure 3 whereby a similar range of time adjustment can be secured.

Figure 4 differs from Figure 3 in that the transformer 52 and resistor 54 of Figure 3 have been replaced by transformer 57 which does not require a saturated core while tube 53 has been replaced by the cold cathode grid controlled tubes 60 and 61 which have resistor 64 between their joined cathodes and ground to form a return path for the rectified current supplied from the secondary of the transformer 57. The resistors 58 and 59 form a potential divider which determines the positive potential that will appear upon the grid of tube 60 and thereby determine the point on the cycle at which the tube will be rendered conducting. Similarly, resistors 62 and 63 control the grid potential and the resultant point on the voltage wave at which tube 61 will start to pass current. The potential across resistor 64 is approximately zero for that part of a cycle where neither tube 60 nor tube 61 is passing current and rises to a positive value with respect to ground when either tube passes current. The rising of the potential across resistor 64 causes capacitor 40 to change its potential with respect to ground without a material change of the voltage across its terminals due to the relative values of the microfarad capacity of capacitor 40 and the values of resistors 38 and 64, thus causing a positive potential to appear upon the grid of tube 41. When this positive potential appears upon the grid of tube 41, it passes current between the plate and cathode as described above and causes the beam of the cathode ray tube 32 to sweep in a manner previously described. The time delay of the initiation of the sweep of the beam is produced by the adjustment of the resistor 55 in the phase shifting circuit as described in connection with the circuit of Figure 3 as well as by adjusting the grid potential between 58 and 59 as well as between 62 and 63. The advantage of using tubes 60 and 61 is that a very steep fronted wave of voltage may be applied to the grid of the tube 41 and cause it to fire in exact synchronism with the desired point of the A. C. supply voltage.

When using either the circuit of Figure 3 or the circuit of Figure 4, the potential of capacitor 45 required to sweep the beam of tube 32 from right to left may be much lower since there is no need for a relatively long delay between the time of excitation of the grid of tube 41 and the time of appearance of the beam on the screen of tube 32 as was required when using the circuit of Figure 1.

The circuit of Figure 5 differs from that of Figure 1 in that the rectifier tubes 3 and 4 are omitted and resistor 48 and capacitor 49 have been added. The ohmic value of 6 equals that of 48 and the microfarad capacity of 7 equals that of 49. In this modified circuit the capacitor 49 charges through resistor 48 from transformer 2 and capacitor 7 charges through resistor 6 from transformer 1. In the arrangement just described the oscillatory circuit embodying the comparison winding 17 includes capacitor 49 and the oscillatory circuit embodying winding 16 to be tested includes capacitor 7. By the modified means just described the impulse of current passes alternately through windings 16 and 17 in the same manner as in the apparatus of Figure 1.

The particular case described above is concerned with oscillatory decay of a charge through a circuit containing capacitance C, resistance R, and inductance L. This type of decay is a result of the well-known balancing condition for these circuits existing such that $R^2 C$ is less than $4 L$. In the case of $R^2 C$ is greater than $4 L$, the result is a logarithmically decaying curve when current produced at the output end of the circuit is plotted against time. The method of testing hereinabove described is capable of equally satisfactory results in this non-oscillatory case. The screen of the oscilloscope exhibits a pair of logarithmically decaying curves, relatively displaced by an amount increasing with time if the two windings compared are different. If the windings are exactly alike, the curve of the test winding is superimposed on the curve of the comparison standard winding and the pair appear visually as a single curve.

Having fully described my invention, that which I claim as novel and desire to protect by Letters Patent of the United States is:

1. An apparatus for testing an electrical winding comprising a circuit including a series connected inductive comparison winding having known electrical constants; a second circuit in which an inductive winding to be tested is connected having electrical constants like those in said comparison winding and electrically coupled to said circuit; a capacitor included in each circuit and series connected therein at least during the time of energy flow for making it oscillatory; means for charging said capacitor; means for alternately energizing each circuit from said capacitor; a cathode-ray oscilloscope having a screen, a deflectable beam, and two beam deflecting means whose axes are non-parallel; a deflecting circuit for controlling one of the beam deflecting means electrically coupled to both of said circuits and energizable by energy received from either of said first two mentioned circuits; and a sweep circuit comprised of a second capacitor from a direct current source across which is connected the plate and cathode of a grid controlled gaseous rectifier, the grid being biased negatively and electrically coupled to both of said circuits for control of the other beam deflecting means energizable through a time delay circuit including a resistance and capacity electrically coupling said grid to said first two mentioned circuits, the constants of said time delay circuit being so proportioned as to cause said tube to discharge said second capacitor at such a time and rate as to cause the screen of said cathode-ray oscilloscope to embrace only a portion of the path of the wave responsive motion of said beam in the oscilloscope for indicating the condition of said test winding.

2. An apparatus for testing an electrical winding comprising a circuit including a series connected inductive comparison winding having known electrical constants; a second circuit in which an inductive winding to be tested is series connected having constants like those in said comparison winding and electrically coupled to said circuit; a capacitor included in each circuit at least during the time of energy flow therein for making it oscillatory; an alternating current power source means for charging said capacitor from said power source, including a thermionic grid controlled rectifier tube in each discharge circuit whose grid causes the rectifier to pass current in response to alternate half cycles of the power source; means for discharging said capacitor alternately through each circuit; and a frequency indicating means coupled to each of said circuits for indicating the condition of said test winding.

EARL W. BAUER.

REFERENCES CITED

The following references are of record in the file of this patent:

UNITED STATES PATENTS

| Number | Name | Date |
|---|---|---|
| 1,717,400 | Nyquist | June 18, 1929 |
| 2,032,904 | Beallaschi | Mar. 3, 1936 |
| 2,185,292 | Candler et al. | Jan. 2, 1940 |
| 2,321,424 | Rohats | June 8, 1943 |
| 2,525,413 | Johnson | Oct. 10, 1950 |

OTHER REFERENCES

Publication, "Insulation Testing of Electric Windings," by Foust and Rohats, A. I. E. E. technical paper No. 43-59, December 22, 1942.